United States Patent
Nishida et al.

(10) Patent No.: US 9,505,131 B2
(45) Date of Patent: Nov. 29, 2016

(54) ELASTIC-DEFORMATION-COMPENSATION CONTROL DEVICE AND CONTROL METHOD FOR ARTICULATED ROBOT

(71) Applicant: Kabushiki Kaisha Kobe Seiko Sho (Kobe Steel, Ltd.), Hyogo (JP)

(72) Inventors: Yoshiharu Nishida, Kobe (JP); Takashi Wada, Kobe (JP); Yoshihide Inoue, Fujisawa (JP); Shuichi Inada, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 82 days.

(21) Appl. No.: 14/403,320

(22) PCT Filed: May 30, 2013

(86) PCT No.: PCT/JP2013/065057
§ 371 (c)(1),
(2) Date: Nov. 24, 2014

(87) PCT Pub. No.: WO2013/180223
PCT Pub. Date: Dec. 5, 2013

(65) Prior Publication Data
US 2015/0105905 A1    Apr. 16, 2015

(30) Foreign Application Priority Data
May 30, 2012   (JP) .................. 2012-123239

(51) Int. Cl.
*B25J 9/16*     (2006.01)
*B23K 9/02*    (2006.01)
*B25J 9/06*    (2006.01)

(52) U.S. Cl.
CPC ............ *B25J 9/1692* (2013.01); *B23K 9/0216* (2013.01); *B25J 9/06* (2013.01); *B25J 9/1641* (2013.01);
(Continued)

(58) Field of Classification Search
CPC ................. B25J 9/1641; G05B 2219/39201; G05B 2219/41166; G05B 2219/49384; G05B 2219/39186; G05B 2219/39195
See application file for complete search history.

(56) References Cited

U.S. PATENT DOCUMENTS

| 4,989,161 A | 1/1991 | Oaki |
| 6,295,484 B1 | 9/2001 | Ojima et al. |

(Continued)

FOREIGN PATENT DOCUMENTS

| JP | S61-201304 A | 9/1986 |
| JP | S63-212483 A | 9/1988 |

(Continued)

OTHER PUBLICATIONS

International Search Report; PCT/JP2013/065057; Sep. 3, 2013.
(Continued)

*Primary Examiner* — Khoi Tran
*Assistant Examiner* — Ryan Rink
(74) *Attorney, Agent, or Firm* — Studebaker & Brackett PC

(57) ABSTRACT

In an elastic-deformation-compensation control device (10), a first dynamic characteristic calculation unit (300) performs filtering processing with respect to a motor-angle command value (θmc) outputted from a motor-angle-command-value calculation unit (600), and outputs a processed motor-angle target value (θmd). A second dynamic characteristic calculation unit (400) is provided with a high-frequency cutoff characteristic having a cutoff frequency which is lower than that of the first dynamic characteristic calculation unit (300), performs filtering processing with respect to the output from an axial force torque calculation unit (200), and outputs a processed axial force torque compensation value (fd).

8 Claims, 8 Drawing Sheets

(52) U.S. Cl.
CPC ............... *G05B 2219/39186* (2013.01); *G05B 2219/39201* (2013.01); *G05B 2219/41166* (2013.01); *G05B 2219/45104* (2013.01); *G05B 2219/49384* (2013.01); *Y10S 901/02* (2013.01)

(56) References Cited

U.S. PATENT DOCUMENTS

| | | | |
|---|---|---|---|
| 2001/0033146 A1* | 10/2001 | Kato | B25J 9/1641 318/568.22 |
| 2007/0164695 A1 | 7/2007 | Hagihara | |
| 2011/0125320 A1* | 5/2011 | Bongardt | B25J 9/1664 700/245 |
| 2012/0239198 A1* | 9/2012 | Orita | B25J 9/1641 700/260 |
| 2015/0112484 A1* | 4/2015 | Nishida | G05B 19/4093 700/254 |
| 2015/0367511 A1* | 12/2015 | Nishida | B25J 9/1641 700/254 |

FOREIGN PATENT DOCUMENTS

| | | |
|---|---|---|
| JP | H10-6261 A | 1/1998 |
| JP | H10-217173 A | 8/1998 |
| JP | H10-329063 A | 12/1998 |
| JP | 2003-280703 A | 10/2003 |
| JP | 2005-102427 A | 4/2005 |
| JP | 2005-186235 A | 7/2005 |

OTHER PUBLICATIONS

Written Opinion of the International Searching Authority; PCT/JP2013/065057; Sep. 3, 2013.

* cited by examiner

ELASTIC-DEFORMATION-COMPENSATION CONTROL DEVICE AND CONTROL METHOD FOR ARTICULATED ROBOT

TECHNICAL FIELD

The present invention relates to control for an articulated robot used for, for example, arc welding, and more particularly relates to trajectory control for an articulated robot to enable a weaving motion with high trajectory accuracy.

BACKGROUND ART

When a plurality of base materials are welded by arc welding, welding with weaving motion is employed, in which welding is executed with a sinusoidal-wave weaving motion in a left-right direction of a welding line while a welding electrode is advanced in a welding direction. This welding with weaving motion has been conventionally executed by swinging a welding torch left and right, or tilting the welding torch left and right around the welding torch. When an articulated robot is caused to execute such welding with weaving motion, high trajectory accuracy is required.

In such an articulated robot, servo control is executed on an axis basis. However, since the natural frequency is low, to reduce oscillation, speed feedforward is almost not applied. Hence, an actual feedback value has a large phase delay with respect to a target value, and the response characteristic of a speed control unit of a servo controller varies depending on each axis. The large phase delay and the various response characteristics have resulted in a trajectory error. Also, a motor that causes each axis of such an articulated robot to operate is coupled with an arm through a reduction gear. When elastic deformation due to an insufficiency in stiffness of the reduction gear is corrected, it is a precondition that the motor operates according to a command value. However, since the feedforward does not sufficiently function, the motor is almost incapable of operating according to the command value. Elastic deformation compensation has not sufficiently functioned. The following technology is known as the elastic-deformation-compensation control for such an articulated robot.

Japanese Unexamined Patent Application Publication No. 61-201304 (PTL 1) discloses a method of controlling the position of a robot arm with high accuracy in response to a position command value, even if the mechanical stiffness of a joint group of a reduction gear or the like is low. In this position control method, by substituting a position command value of each arm forming a robot, a speed obtained by first-order differentiation on the position command value, and an acceleration obtained by second-order differentiation on the position command value, into a motion equation of the robot arm with regard to the mechanical stiffness of a joint between respective arms, a torque to be added to each joint is calculated. Then, by dividing the obtained torque by a constant, a function, or a mechanical spring stiffness, which is given as a table in a control device, an elastic deformation angle caused by the mechanical stiffness of each joint is obtained. By adding the obtained elastic deformation angle to the position command value to cancel out the elastic deformation of each joint, a new position command value is set.

Also, Japanese Unexamined Patent Application Publication No. 2005-186235 (PTL 2) discloses a control device for a robot in which each axis operates according to a command even if an interference force acts. This control device is a control device for a robot formed of a plurality of axes that interfere with each other. The robot includes a position control unit and a speed control unit for operating each axis according to a command of the axis, which is formed of a motor, an arm coupled with the motor through a reduction gear or the like, and a motor-position detector that detects the position of the motor. The control device includes an interference-force calculation unit that obtains the interference force acting on other axis by calculation, from a command of a relevant axis, and a non-interference-torque-signal creation unit that obtains a motor-torque command signal so that the relevant axis operates according to a command even if the interference force acts on the relevant axis from the other axis, from the command of the relevant axis and the calculation value of the interference force acting from the other axis. The control device further includes a non-interference-position-signal creation unit that obtains a motor-position signal so that the relevant axis operates according to the command even if the interference force acts on the relevant axis from the other axis, from the command of the relevant axis and the calculation value of the interference force acting from the other axis.

CITATION LIST

Patent Literature

PTL 1: Japanese Unexamined Patent Application Publication No. 61-201304
PTL 2: Japanese Unexamined Patent Application Publication No. 2005-186235

SUMMARY OF INVENTION

Technical Problem

In PTL 1, the warp (elastic deformation) generated due to the insufficiency in stiffness of the reduction gear or the like is calculated from the joint-angle target value or the like, and the elastic deformation amount is added to the angle command value to the motor so as to compensate the elastic deformation, thereby improving the position accuracy. However, since good feedforward control or the like is not executed as described above, the motor does not operate according to the command value, and the elastic deformation compensation does not sufficiently function.

Also, PTL 2 discloses the method of making the interference between the respective axes to be non-interference. However, with this method, the first-order differential value and the second-order differential value of the arm acceleration are required, and this method is extremely weak for noise. Also, even if a slightly rapid operation is made, the second-order differential value of the arm acceleration provides an astronomical value. This method has extremely large restriction when the method is realized.

That is, with the related art, the following problems are not addressed.

(1) The elastic deformation compensation or the axial force torque compensation cannot be effectively provided in a state in which the natural oscillation of the robot is low. Hence, the influence of elastic deformation cannot be compensated, resulting in deterioration in accuracy.

(2) The elastic deformation compensation control cannot be effectively provided in a state in which the phase delay of the servo controller is present. Hence, the influence of elastic deformation cannot be compensated, resulting in deterioration in accuracy.

(3) The servo control characteristic is different depending on each axis. Hence, a difference is generated in the response of each axis, resulting in deterioration in trajectory accuracy.

(4) The phase difference that is generated if the calculation period of the command value is later than the calculation period of the servo controller results in deterioration in trajectory accuracy.

(5) In a weaving operation of the welding robot, it is very important to align the phase delay and gain characteristic with the weaving period. However, it is very difficult to align the phase and gain characteristic for the high-frequency weaving operation because of a change in servo characteristic resulted from the elastic deformation due to the reduction gear, and a difference in characteristic depending on each axis.

The present invention is made in light of the above-described problems. An object of the present invention is to provide, in an articulated robot including a plurality of axes, an elastic-deformation-compensation control device and a control method for an articulated robot, each of which can compensate an influence of elastic deformation of each axis and which enables an operation such as weaving with high trajectory accuracy.

Solution to Problem

To address the above-described problems, an elastic-deformation-compensation control device for an articulated robot according to the present invention takes technical means as follows.

That is, an elastic-deformation-compensation control device for an articulated robot according to the present invention drives a plurality of joint axes to cause a tool attached to the articulated robot to perform a desirable operation, a motor and an arm being coupled through an elastically deformable reduction gear in the articulated robot, the motor driving each of the joint axes of the articulated robot. The elastic-deformation-compensation control device includes a joint-angle-command-value calculation unit that calculates a joint-angle command value $\theta lc$ of each of the joint axes for providing the desirable operation of the tool, and outputs the joint-angle command value $\theta lc$; an axial force torque calculation unit that calculates an axial force torque fc generated when an operation is made according to the joint-angle command value $\theta lc$ and acting on each of the joint axes, from the joint-angle command value $\theta lc$ based on a model of dynamics, and outputs the axial force torque fc; a motor-angle-command-value calculation unit that calculates a motor-angle command value $\theta mc$ from the joint-angle command value $\theta lc$ and the axial force torque fc based on a parameter including a stiffness parameter of the joint axis, and outputs the motor-angle command value $\theta mc$; a first dynamic characteristic calculation unit that has a high-frequency cutoff characteristic having a cutoff frequency being lower than a natural resonance frequency of the robot, executes filtering processing on the motor-angle command value $\theta mc$, and outputs a processed motor-angle target value $\theta md$; a motor-angle control unit that receives the motor-angle target value $\theta md$ input as a target value for the motor; a second dynamic characteristic calculation unit that has a high-frequency cutoff characteristic having a cutoff frequency being lower than or equal to the first dynamic characteristic calculation unit, executes filtering processing on at least one of an input to the axial force torque calculation unit and an output from the axial force torque calculation unit, and outputs a processed axial force torque compensation value fd; and a motor-current control unit that receives a value input as a target value, in which the axial force torque compensation value fd is added to a motor-torque command value output from the motor-angle control unit.

In the elastic-deformation-compensation control device, preferably, a phase delay of the first dynamic characteristic calculation unit of a axis with a late response of the motor-angle control unit may be set to be shorter than a phase delay of the first dynamic characteristic calculation unit of a axis with an early response of the motor-angle control unit.

In the elastic-deformation-compensation control device, further preferably, a feedback control dynamic characteristic from the motor-angle target value $\theta md$ to an actual motor angle $\theta m$ in a state without an axial force among the respective axes may be calculated based on a parameter including at least one of a position feedback gain and a speed feedback gain. Also, the cutoff frequency in the second dynamic characteristic calculation unit may be set to be lower than the cutoff frequency in the first dynamic characteristic calculation unit, and the characteristic of the first dynamic characteristic calculation unit may be given to correspond to a characteristic obtained by dividing the characteristic in the second dynamic characteristic calculation unit by the feedback control dynamic characteristic.

In the elastic-deformation-compensation control device, further preferably, when a current control characteristic of the motor-current control unit is considered, the characteristic of the first dynamic characteristic calculation unit may be given to correspond to a characteristic obtained by dividing the characteristic in the second dynamic characteristic calculation unit by the feedback control dynamic characteristic and multiplying the divided value by the current control characteristic.

In the elastic-deformation-compensation control device, further preferably, if a calculation period in the motor-angle-command-value calculation unit is later than a control period in the motor-angle control unit, in the motor-angle-command-value calculation unit, a phase difference between an axial force torque calculation value or an elastic-deformation amount calculation value and a joint-angle command value may be corrected, and a motor-angle command value may be calculated from the axial force torque calculation value or elastic-deformation amount calculation value after the phase correction and the joint-angle command value after the phase correction.

Also, an elastic-deformation-compensation control method for an articulated robot according to another aspect of the present invention includes a joint-angle-command-value calculation step of calculating a joint-angle command value $\theta lc$ of each of the joint axes for providing a desirable tool operation, and outputting the joint-angle command value $\theta lc$; an axial force torque calculation step of calculating an axial force torque fc generated when an operation is made according to the joint-angle command value $\theta lc$ and acting on each of the joint axes, from the joint-angle command value $\theta lc$ based on a model of dynamics, and outputting the axial force torque fc; a motor-angle-command-value calculation step of calculating a motor-angle command value $\theta mc$ from the joint-angle command value $\theta lc$ and the axial force torque fc based on a parameter including a stiffness parameter of the joint axis, and outputting the motor-angle command value $\theta mc$; a first dynamic characteristic calculation step of having a high-frequency cutoff characteristic having a cutoff frequency being lower than a natural resonance frequency of the robot, executing filtering processing on the motor-angle command value θmc, and outputting a processed motor-angle target value θmd; a motor-angle control step of receiving the motor-angle target value θmd input as a target value for the motor; a second dynamic characteristic calculation step of having a high-frequency cutoff characteristic having a cutoff frequency being lower than or equal to the first dynamic characteristic calculation step, executing filtering processing on at least one of an input to the axial force torque calculation step and an output from the axial force torque calculation step, and outputting a processed axial force torque compensation value fd; and a motor-current control step of receiving a value input as a target value, in which the axial force torque compensation value fd is added to a motor-torque command value output from the motor-angle control step.

Advantageous Effects of Invention

By using the elastic-deformation-compensation control device or the control method according to the present invention, in the articulated robot including the plurality of axes, the influence of elastic deformation of each axis is compensated, and the operation such as weaving is enabled with high trajectory accuracy.

DESCRIPTION OF EMBODIMENTS

An elastic-deformation-compensation control device and a control method for an articulated robot according to an embodiment of the invention are described in detail below with reference to the drawings. In the following description, the same reference sign is applied to the same part, and the name and function of the part are also the same. Hence, the detailed description of such a part is not repeated. Also, described below is an articulated robot that causes a welding torch to perform a tilting operation (weaving operation) as a control subject; however, it is merely an example. The elastic-deformation-compensation control device according to the invention can be widely applied to control for driving a plurality of joint axes to cause a tool attached to an articulated robot to perform a desirable operation, the articulated robot in which a motor that drives each joint axis of the articulated robot and an arm are coupled through an elastically deformable reduction gear.

First Embodiment

General Configuration

First, an overview of a vertical articulated robot (hereinafter, occasionally merely referred to as articulated robot), to which an elastic-deformation-compensation control device according to this embodiment is applied, is described.

Figure 1:
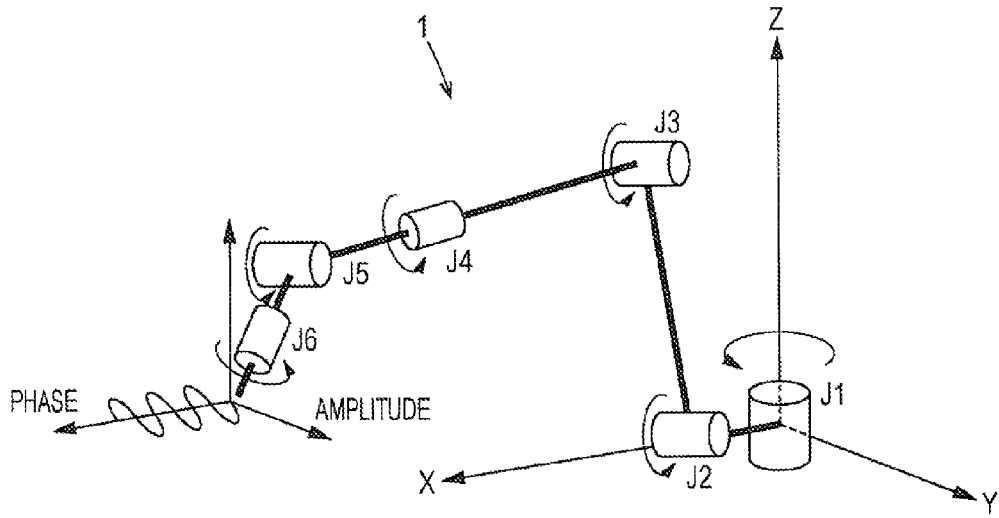
FIG. 1 is a schematic illustration showing a general configuration of an articulated robot to which an elastic-deformation-compensation control device according to an embodiment of the invention is applied.

FIG. 1 is an example of a robot that causes a welding torch to perform a tilting operation (weaving operation). FIG. 1 shows an overview of an articulated robot 1 to which the elastic-deformation-compensation control device according to this embodiment is applied. The articulated robot 1 is a vertical articulated type, and includes six joints J1 to J6. A welding torch is provided at a distal end of the axis of J6, a welding wire is fed from the welding torch, and hence arc welding is executed with the welding wire. In the articulated robot 1, an area between predetermined welding start point and welding end point is set as a welding work section. The articulated robot 1 is set to cause the welding wire to perform a tilting operation (weaving operation) with predetermined amplitude and frequency while moving in a welding line direction connecting the welding start point and the welding end point.

The articulated robot 1 includes, in addition to a main body of the illustrated articulated robot 1, a control device (servo controller) that includes a teach pendant and controls each axis by servo control, and a higher-order computer (higher-order CPU). The control device and the higher-order computer provide a trajectory control device according to this embodiment.

The control device (servo controller) controls the welding torch provided at the articulated robot 1 according to a previously taught program, to move with the weaving operation along the above-described welding line. A teach program may be created by using a teach pendant connected with the control device, or may be created by an offline teach system using the higher-order computer. In either case, the teach program is created before the actual operation. The higher-order computer generates a welding trajectory and a weaving operation command based on the welding trajectory.

Control Block

Figure 2:
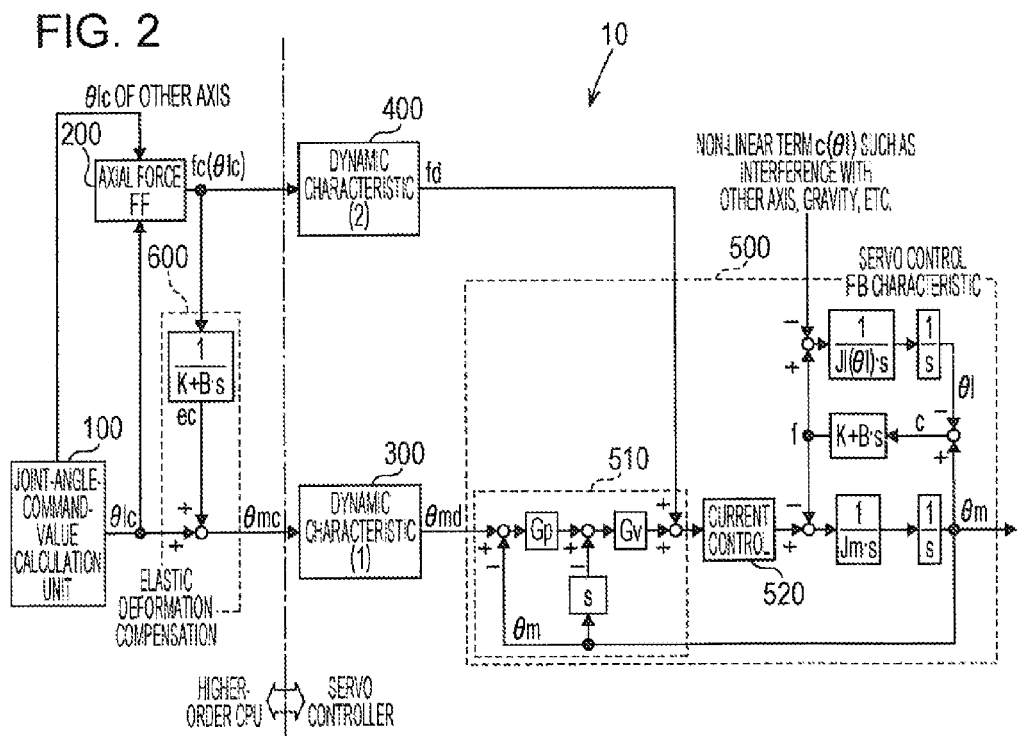
FIG. 2 is a control block diagram of an elastic-deformation-compensation control device according to a first embodiment of the invention.

FIG. 2 is a control block diagram of an elastic-deformation-compensation control device 10 that controls the articulated robot 1 of FIG. 1. As described above, the elastic-deformation-compensation control device 10 includes a part provided by the higher-order CPU, and a part provided by the servo controller.

As shown in FIG. 2, the elastic-deformation-compensation control device 10 drives a plurality of joint axes to cause a tool (in this case, welding torch) attached to the articulated robot 1 to perform a desirable motion (in this case, weaving operation).

The elastic-deformation-compensation control device 10 includes a joint-angle-command-value calculation unit 100, an axial force torque calculation unit (illustrated as "axial force FF") 200, and a motor-angle-command-value calculation unit (illustrated as "elastic deformation compensation") 600, provided by the higher-order CPU. Further, the elastic-deformation-compensation control device 10 includes a first dynamic characteristic calculation unit (illustrated as "dynamic characteristic (1)") 300, a second dynamic characteristic calculation unit (illustrated as "dynamic characteristic (2)") 400, and a feedback control unit (illustrated as "servo control FB characteristic") 500, provided by the servo controller. The feedback control unit 500 includes a motor-angle control unit 510, and a motor-current control unit (illustrated as current control") 520. In the following description, the characteristic of an element in the control block is a dynamic characteristic even when the characteristic is not described as the dynamic characteristic. Also, wording "FB" represents feedback, and wording "FF" represents feedforward.

The joint-angle-command-value calculation unit 100 calculates a joint-angle command value θlc of each joint axis for providing the weaving operation of the welding torch.

The axial force torque calculation unit 200 calculates an axial force torque fc, which is generated when the operation is made according to the joint-angle command value θlc output from the joint-angle-command-value calculation unit 100 and acts on each joint axis, from the joint-angle command value θlc based on a model of dynamics, and outputs the axial force torque fc.

The motor-angle-command-value calculation unit 600 calculates a motor-angle command value θmc from the joint-angle command value θlc and the axial force torque fc based on a parameter including a stiffness parameter of the joint axis.

To be more specific, the axial force torque calculation unit 200 calculates the axial force torque fc, which acts on each joint axis when the operation is made according to the command value based on the joint-angle command value θlc. The motor-angle-command-value calculation unit 600 calculates an elastic deformation amount ec from the axial force torque fc based on an axial stiffness K and a viscosity B (the viscosity may be omitted because it is a small value). Then, the motor-angle-command-value calculation unit 600 calculates the motor-angle command value θmc from the joint-angle command value θlc and the elastic deformation amount ec.

The first dynamic characteristic calculation unit 300 performs filtering processing on the motor-angle command value θmc output from the motor-angle-command-value calculation unit 600, and outputs a processed motor-angle target value θmd. The first dynamic characteristic calculation unit 300 has a high-frequency cutoff characteristic having a cutoff frequency being lower than the natural resonance frequency of the articulated robot 1.

The second dynamic characteristic calculation unit 400 performs filtering processing on at least one of an input to the axial force torque calculation unit 200 and an output from the axial force torque calculation unit 200, and outputs a processed axial force torque compensation value fd. In FIG. 2, the second dynamic characteristic calculation unit 400 performs filtering processing on the output from the axial force torque calculation unit 200. The second dynamic characteristic calculation unit 400 has a high-frequency cutoff characteristic having a cutoff frequency being lower than or equal to that of the first dynamic characteristic calculation unit 300.

The motor-angle control unit 510 receives the motor-angle target value θmd input as a target value for the motor.

The motor-current control unit 520 receives a value input as a target value, in which the axial force torque compensation value fd output from the second dynamic characteristic calculation unit 400 is added to the motor-torque command value output from the motor-angle control unit 510, as a target value.

The elastic-deformation-compensation control device 10 shown in the block diagram of FIG. 2 has features as follows.

The second dynamic characteristic calculation unit 400 is arranged upstream and/or downstream (in this case, only downstream) of the axial force torque calculation unit 200 being a nonlinear term. The second dynamic characteristic calculation unit 400 gives a characteristic of cutting off a high-frequency band being equal to or higher than the high-frequency cutoff characteristic of the first dynamic characteristic calculation unit 300. The cutoff frequency of the second dynamic characteristic calculation unit 400 is lower than or equal to the cutoff frequency of the first dynamic characteristic calculation unit 300.

With this configuration, the first dynamic characteristic calculation unit 300 can restrict a high frequency containing a natural oscillation component contained in the joint-angle command value θlc. Further, the second dynamic characteristic calculation unit 400 can restrict a high frequency containing a natural oscillation component contained in the axial force torque fc. Accordingly, the high-frequency oscillation generated at the articulated robot 1 can be restricted.

Also, in the articulated robot 1, when the joint angle is changed, even if a low-frequency operation is performed in an XYZ space, a high frequency with a twice or triple component is generated in an area, in which Jacobian is rapidly changed, such as a position around a specific point. Further, even if the low-frequency operation is performed in a joint-angle space, since the nonlinear term has a square term or the like of the speed, a high frequency with a twice or triple component of the joint angle is generated. Owing to this, the axial force torque fc, which is the output from the axial force torque calculation unit 200, being the nonlinear term is processed by the second dynamic characteristic calculation unit 400 having the high-frequency cutoff characteristic being equal to or higher than the high-frequency cutoff characteristic of the first dynamic characteristic calculation unit 300, and is used as the axial force torque compensation value fd. Accordingly, the high-frequency oscillation generated at the articulated robot 1 can be further restricted.

Control Characteristic (Weaving Trajectory)

A control characteristic (weaving trajectory) when the articulated robot 1 is controlled by using the elastic-deformation-compensation control device 10 with the above-described configuration is described.

Figure 3:
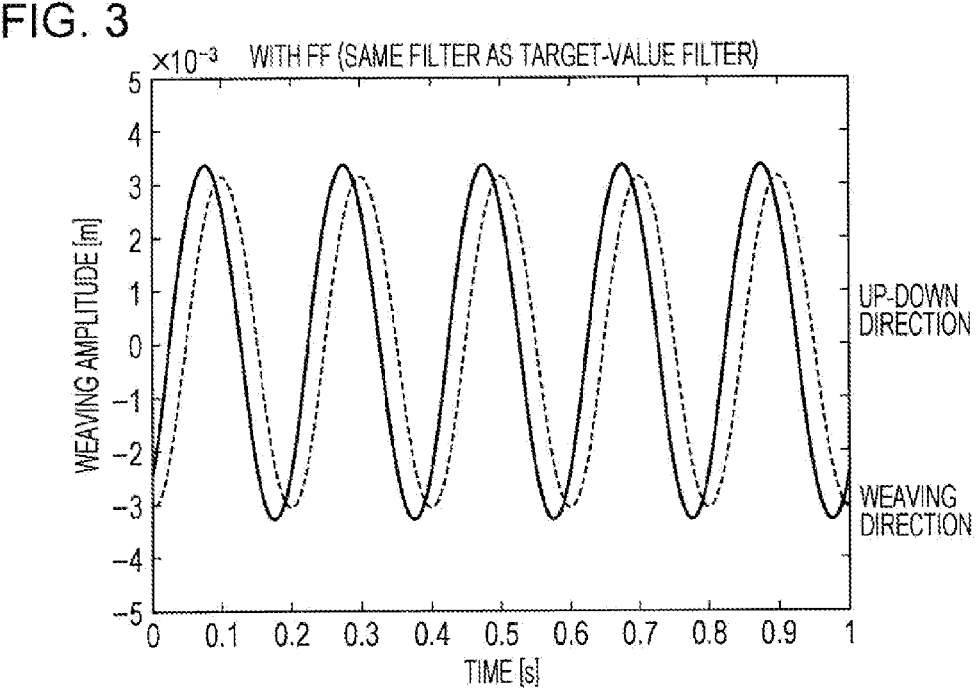
FIG. 3 is an illustration showing a weaving trajectory of an articulated robot controlled with the control block diagram shown in FIG. 2.

FIG. 3 shows a weaving trajectory when a high-frequency cutoff characteristic equivalent to that of the first dynamic characteristic calculation unit 300 is given as the high-frequency cutoff characteristic of the second dynamic characteristic calculation unit 400.

Before evaluation of this, related art (control block diagram and weaving trajectory) is described first.

Figure 4:
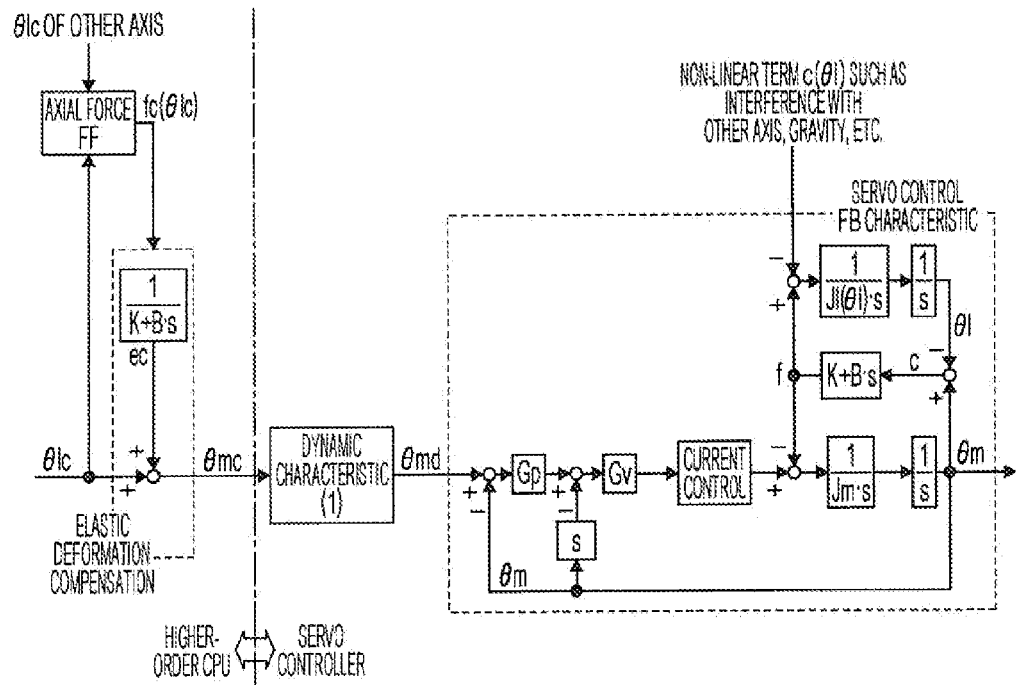
FIG. 4 is a control block diagram of an elastic-deformation-compensation control device according to related art.

FIG. 4 is a control block diagram of the most typical articulated robot. As shown in FIG. 4, this control block is formed of a position control unit (Gp), a speed control unit (Gv), and a current control unit. The position control unit controls a joint angle by feedback control, controls the angle deviation by proportional control (P control), and gives the obtained value as a speed command to the speed control unit. The speed control unit controls a joint-angle speed by feedback control, controls the deviation with respect to the given speed command by proportional integral control (PI control), and gives the obtained value as a current control command to the current control unit. The current control unit controls motor current based on the given current control command.

Since the articulated robot has a low natural frequency of a machine, to prevent a component that excites the natural oscillation from being contained in the target value, the component is restricted by filter processing in the first dynamic characteristic calculation unit (dynamic characteristic 1) etc. shown in FIG. 4.

However, in the articulated robot, an interference torque acts on each link between axes as a nonlinear term c including a gravity term etc. Since the link and the motor are coupled through the reduction gear that acts as a spring element, the axial force acts as action and reaction on the link and the motor. Particularly in the weaving operation of the welding robot, since it is required to swing the welding torch in a desirable direction with a desirable amplitude without an up-down deflection (without a motion generated in the up-down direction), dynamic control with very high accuracy is required. Owing to this, the influence of the axial force and elastic deformation is significantly large.

Figure 5:
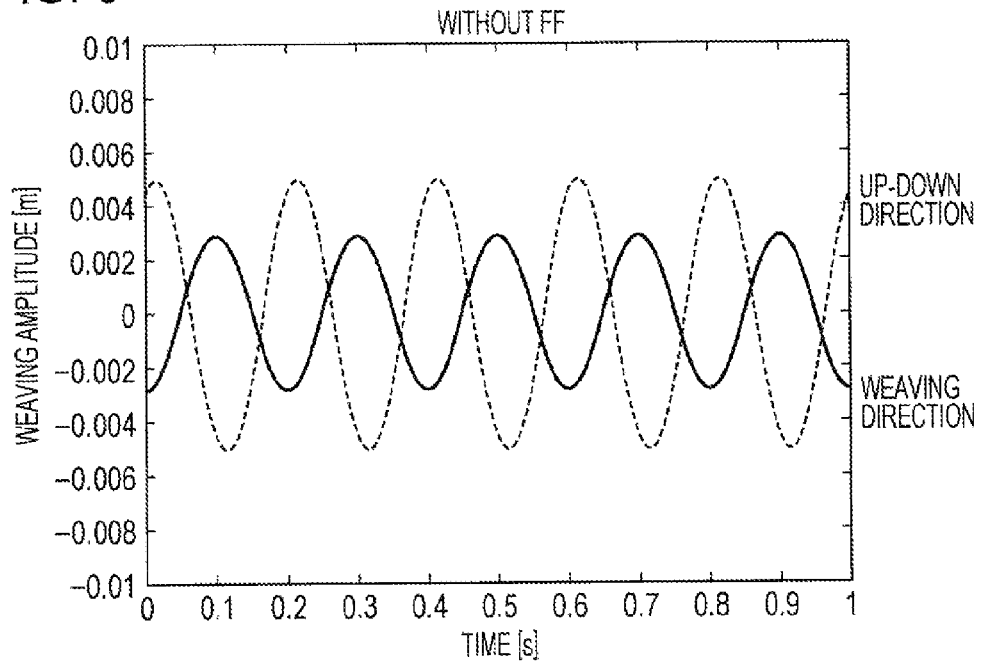
FIG. 5 is an illustration showing a weaving trajectory of an articulated robot controlled with the control block diagram shown in FIG. 4.

FIG. 5 shows a weaving trajectory when an articulated robot is controlled by the control device shown in the control block of FIG. 4. As shown in FIG. 5, if the nonlinear term, axial force, and elastic deformation act, a motion in the up-down direction is generated, and this is not desirable as the weaving motion. To restrict this, it is considered that the axial force is calculated on a target-value basis, and may be compensated by feedforward compensation.

Figure 6:
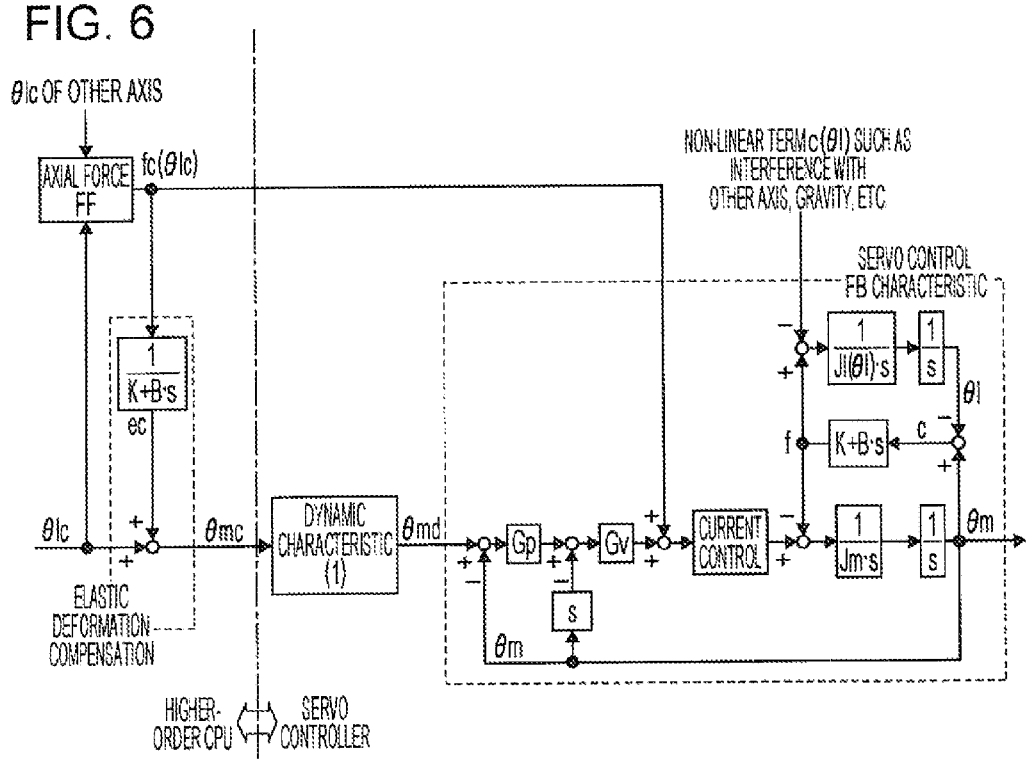
FIG. 6 is a control block diagram of another elastic-deformation-compensation control device according to related art.

FIG. 6 is a control block diagram that provides nonlinear feedforward compensation according to related art, on a target-value basis with regard to such consideration.

Figure 7:
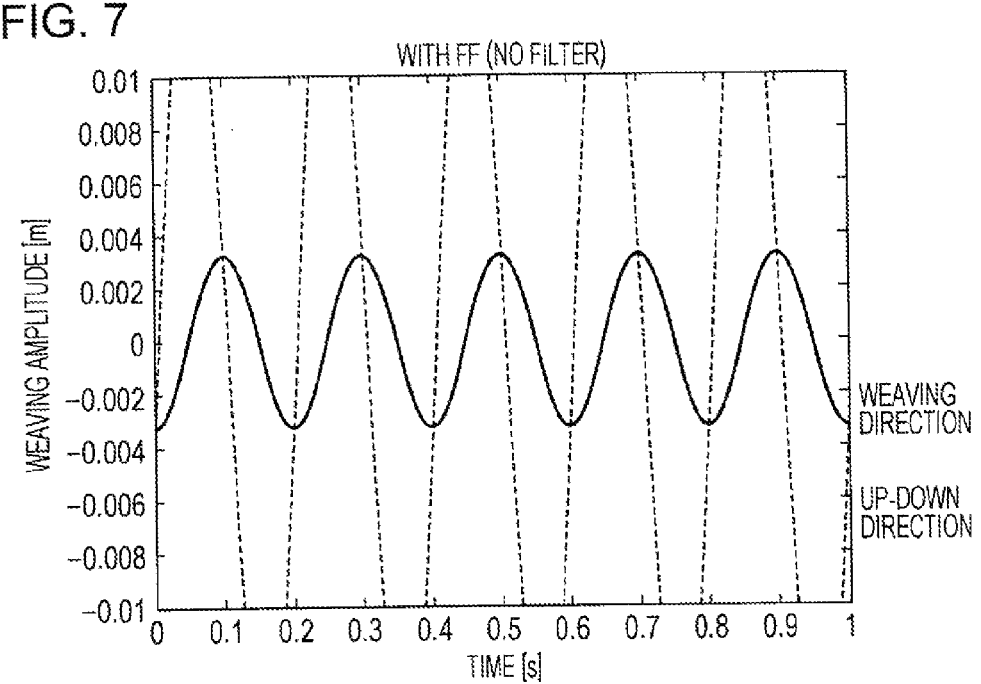
FIG. 7 is an illustration showing a weaving trajectory of an articulated robot controlled with the control block diagram shown in FIG. 6.

FIG. 7 shows a weaving trajectory when an articulated robot is controlled by the control device shown in the control block of FIG. 6. Since this is the feedforward compensation on a target-value basis, the feedforward timing is deviated due to the influence of a phase delay, and the compensation rather worsens the motion in the up-down direction.

In general, with the control according to such related art, since the phase characteristic and gain characteristic of a feedback controller (servo control feedback characteristic) are different depending on each axis, it has been difficult to align the phases of feedforward control or the like. Hence, axial force torque compensation and elastic deformation compensation like those described above almost have not been in practical use, and it has been difficult to restrict the influence of elastic deformation or the like.

In FIG. 6, the higher-order CPU executes nonlinear feedforward calculation. Since the calculation of the nonlinear term is complicated and the calculation amount is large, it is difficult to execute calculation in the servo controller. Hence, the calculation is typically executed on a target-value basis in the higher-order CPU.

When the results (weaving trajectories) according to the controls of such related art in FIGS. 5 and 7 are compared with the embodiment, the result (weaving trajectory) of the elastic-deformation-compensation control device 10 according to this embodiment has an up-down motion component generated as shown in FIG. 3; however, the up-down motion component is markedly restricted. FIG. 3 shows the result when the high-frequency cutoff characteristic in the second dynamic characteristic calculation unit 400 is set to be equal to the high-frequency cutoff characteristic in the first dynamic characteristic calculation unit 300.

In the elastic-deformation-compensation control device 10 according to this embodiment, the first dynamic characteristic calculation unit 300 restricts the high frequency containing the natural oscillation component contained in the joint-angle command value θlc. Further, the second dynamic characteristic calculation unit 400 can restrict the high frequency containing the natural oscillation component contained in the axial force torque fc. Accordingly, the oscillation resulted from the nonlinear term according to the aforementioned related art is restricted.

As described above, with the elastic-deformation-compensation control device according to this embodiment, in the articulated robot, the influence of elastic deformation of each axis is compensated and a motion such as weaving is enabled with high trajectory accuracy.

Second Embodiment

An elastic-deformation-compensation control device according to a second embodiment of the invention is described below. The elastic-deformation-compensation control device according to this embodiment differs from the elastic-deformation-compensation control device 10 according to the above-described first embodiment in the method of giving the first dynamic characteristic calculation unit 300. Other configuration is similar to that of the first embodiment, and hence the part redundant to the above-described configuration is not repeated this time.

In the above-described first embodiment, the high-frequency cutoff characteristic equal to or higher than that of the first dynamic characteristic calculation unit 300 is given to the second dynamic characteristic calculation unit 400. In this embodiment, a high-frequency cut off characteristic is given to the second dynamic characteristic calculation unit 400 such that the second dynamic characteristic calculation unit 400 has a very high high-frequency cutoff characteristic similarly to the first embodiment. Also, a high-frequency cutoff characteristic is given to the first dynamic characteristic calculation unit 300 as a characteristic obtained by multiplying the dynamic characteristic of the second dynamic characteristic calculation unit 400 by the reverse characteristic of a feedback characteristic expected for servo control for each axis. This represents that the characteristic of the first dynamic characteristic calculation unit 300 is given to correspond to a characteristic obtained by dividing the characteristic in the second dynamic characteristic calculation unit 400 by the feedback control dynamic characteristic.

In the case of the control block shown in FIG. 2, the dynamic characteristic of servo feedback control for each axis is given by Expression (1) as follows. In the following expression, "dynamic characteristic 1" indicates a dynamic characteristic in the first dynamic characteristic calculation unit 300, and "dynamic characteristic 2" indicates a dynamic characteristic in the second dynamic characteristic calculation unit 400.

$$\frac{\text{current control characteristic} \times (Gp \cdot Gv \cdot s + Gp \cdot Gi)}{J_m \cdot s^3 + \text{current control characteristic} \times} \quad (1)$$
$$(Gv \cdot s^2 + (Gp \cdot Gv + Gi) \cdot s + Gp \cdot Gi)$$

Hence, the first dynamic characteristic calculation unit 300 is given by Expression (2) as follows.

dynamic characteristic 2 / servo FB control dynamic characteristic× (2)

$$\text{current control characteristic} = \text{dynamic characteristic2} \times$$
$$\frac{J_m \cdot s^3 + \text{current control characteristic} \times}{(Gv \cdot s^2 + (Gp \cdot Gv + Gi) \cdot s + Gp \cdot Gi)}{Gp \cdot Gv \cdot s + Gp \cdot Gi}$$

However, a high-frequency cutoff characteristic has to be given to the second dynamic characteristic calculation unit 400 so that Expression (2) becomes a proper transfer function (an order of a numerator polynomial is equal to or lower than that of a denominator polynomial).

Figure 8:
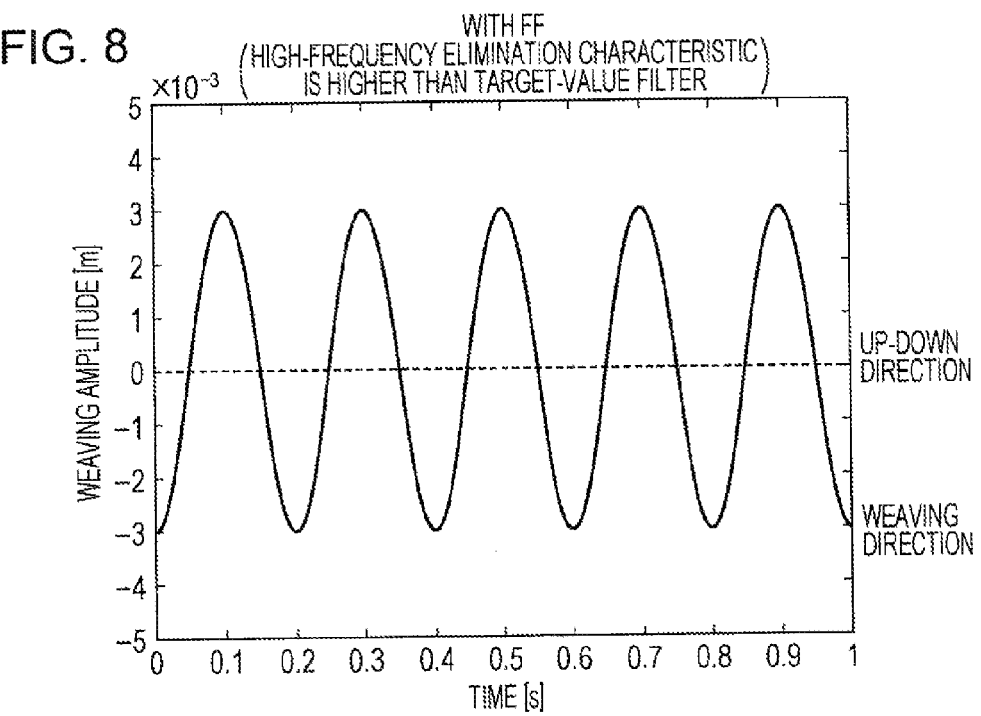
FIG. 8 is an illustration showing a weaving trajectory of an articulated robot controlled by an elastic-deformation-compensation control device (characteristic being different from dynamic characteristic in FIG. 2) according to a second embodiment of the invention.

FIG. 8 shows a weaving trajectory when the first dynamic characteristic calculation unit 300 and the second dynamic characteristic calculation unit 400 are given as described above. As shown in FIG. 8, in the weaving trajectory by the elastic-deformation-compensation control device according to this embodiment, it is found that the oscillation in the up-down direction is further restricted as compared with the weaving trajectory (FIG. 3) according to the first embodiment.

As described above, with the elastic-deformation-compensation control device according to this embodiment, in the articulated robot, the influence of elastic deformation of each axis is compensated and a motion such as weaving is enabled with further high trajectory accuracy.

Modification of Second Embodiment

Next, an elastic-deformation-compensation control device according to a modification of the second embodiment of the invention is described below.

As described above, the characteristic of the second dynamic characteristic calculation unit 400 is given as a desirable dynamic characteristic (having a very high high-frequency cutoff characteristic). However, if the current control characteristic of the motor-current control unit 520 is not negligible, the characteristic of the second dynamic characteristic calculation unit 400 is given as a characteristic obtained by dividing the desirable dynamic characteristic by the current control characteristic. This represents that, if the current control characteristic of the motor-current control unit 520 is considered, the characteristic of the first dynamic characteristic calculation unit 300 is given to correspond to a characteristic obtained by dividing the characteristic in the second dynamic characteristic calculation unit 400 by the feedback control dynamic characteristic and multiplying the divided value by the current control characteristic.

In this case, the characteristic of the second dynamic characteristic calculation unit 400 is given by Expression (3) as follows.

dynamic characteristic 2=desirable dynamic characteristic/current control characteristic (3)

Hence, the characteristic of the first dynamic characteristic calculation unit 300 expressed in aforementioned Expression (2) is given by Expression (4) as follows.

dynamic characteristic 2 / servo FB control dynamic characteristic× (4)

current control characteristic = desireable dynamic characteristic×

$$\frac{J_m \cdot s^3 + \text{current control characteristic} \times}{(Gv \cdot s^2 + (Gp \cdot Gv + Gi) \cdot s + Gp \cdot Gi)}{\text{current control characteristic} \times (Gp \cdot Gv \cdot s + Gp \cdot Gi)}$$

Figure 9:
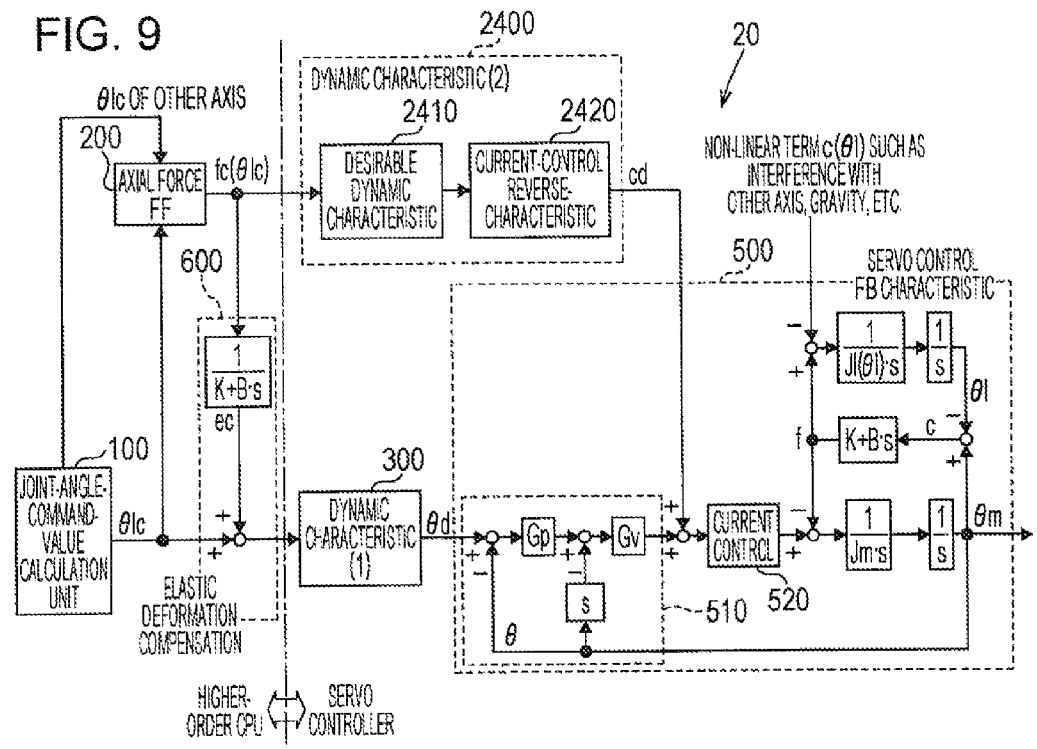
FIG. 9 is a control block diagram of an elastic-deformation-compensation control device according to a modification of the second embodiment of the invention.

FIG. 9 is a control block diagram when the characteristics of the first dynamic characteristic calculation unit 300 and the second dynamic characteristic calculation unit 400 are given as described above. As shown in FIG. 9, the characteristic of a second dynamic characteristic calculation unit 2400 in an elastic-deformation-compensation control device 20 is obtained by multiplying a desirable dynamic characteristic 2410 by a reverse characteristic 2420 of the current control characteristic.

As described above, with the elastic-deformation-compensation control device according to this modification, in the articulated robot, the current control characteristic of the motor-current control unit 520 is considered, the influence of elastic deformation of each axis is compensated, and a motion such as weaving is enabled with further high trajectory accuracy.

Third Embodiment

An elastic-deformation-compensation control device according to a third embodiment of the invention is described below. The elastic-deformation-compensation control device according to this embodiment differs from the elastic-deformation-compensation control device 10 according to the above-described first embodiment in the method of giving the first dynamic characteristic calculation unit 300. Other configuration is similar to that of the first embodiment, and hence the part redundant to the above-described configuration is not repeated this time.

If it is considered that good performance can be obtained although the current control characteristic is approximated to 1 for very high speed response, Expression (1) is modified to Expression (5) as follows.

$$\frac{Gp \cdot Gv \cdot s + Gp \cdot Gi}{J_m \cdot s^3 + Gv \cdot s^2 + (Gp \cdot Gv + Gi) \cdot s + Gp \cdot Gi} \quad (5)$$

Expression (2) that gives the first dynamic characteristic calculation unit 300 is modified to Expression (6) as follows.

dynamic characteristic2 / servo FB control dynamic characteristic = (6)

dynamic characteristic2 ×

$$\frac{J_m \cdot s^3 + Gv \cdot s^2 + (Gp \cdot Gv + Gi) \cdot s + Gp \cdot Gi}{Gp \cdot Gv \cdot s + Gp \cdot Gi}$$

This represents that the cutoff frequency in the second dynamic characteristic calculation unit 400 is set to be lower than the cutoff frequency of the first dynamic characteristic calculation unit 300 and the characteristic of the first dynamic characteristic calculation unit 300 is given to correspond to a characteristic obtained by dividing the characteristic in the second dynamic characteristic calculation unit 400 by a feedback control dynamic characteristic (servo FB control dynamic characteristic).

In this case, the feedback control dynamic characteristic from the motor-angle target value θmd to the actual motor angle θm in the state without an axial force among the respective axes is calculated based on a parameter including at least one of a position feedback gain and a speed feedback gain.

Figure 10:
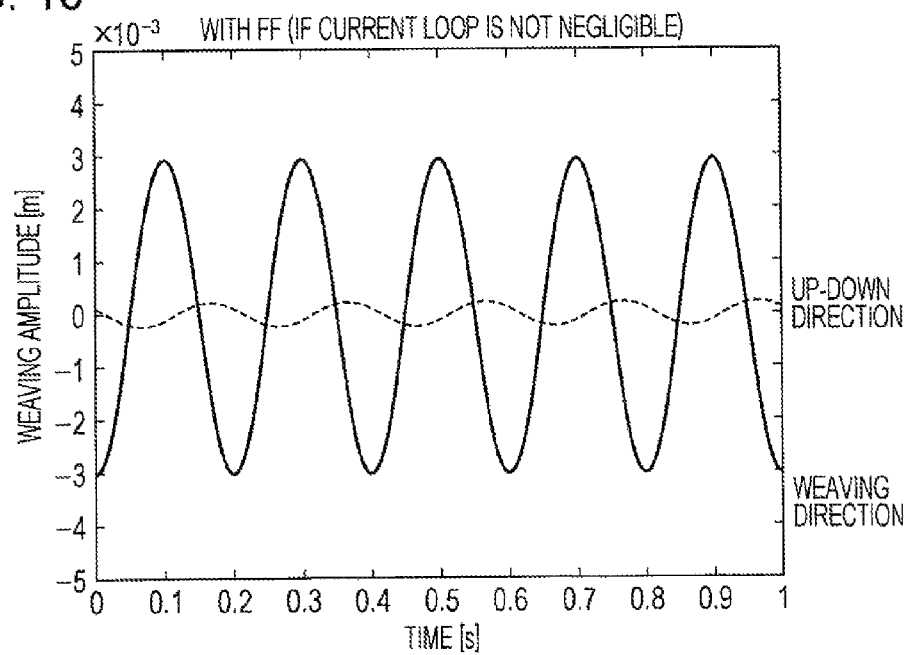
FIG. 10 is an illustration showing a weaving trajectory of an articulated robot controlled by an elastic-deformation-compensation control device (characteristic being different from dynamic characteristic in FIG. 2) according to a third embodiment of the invention.

FIG. 10 shows a weaving trajectory when the first dynamic characteristic calculation unit 300 and the second dynamic characteristic calculation unit 400 are given as described above. As shown in FIG. 10, in the elastic-deformation-compensation control device according to this embodiment, since the current control characteristic is approximated to 1, of course, the performance of the weaving trajectory in this embodiment is not as good as the performance of the weaving trajectory (FIG. 8) according to the second embodiment. However, it is found that performance sufficient for practical use is exhibited as compared with related art. As described above, by approximating the current control characteristic to 1, the calculation time can be reduced while the performance sufficient for practical use is satisfied.

Forth Embodiment

An elastic-deformation-compensation control device according to a fourth embodiment of the invention is described below. The elastic-deformation-compensation control device according to this embodiment differs from the elastic-deformation-compensation control device 10 according to the above-described first embodiment in the method of giving the first dynamic characteristic calculation unit 300. Other configuration is similar to that of the first embodiment, and hence the part redundant to the above-described configuration is not repeated this time.

The elastic-deformation-compensation control device according to this embodiment is configured such that the phase delay of the first dynamic characteristic calculation unit 300 of an axis with a late response of the motor-angle control unit 510 is given to be shorter than the phase delay of the first dynamic characteristic calculation unit 300 of an axis with an early response of the motor-angle control unit 510.

In the above-described second and third embodiments, a desirable dynamic characteristic is given to each axis. However, the dynamic characteristics of the respective axes have to be aligned in an actual weaving operation. To attain this, the same (common) desirable dynamic characteristic may be given to all axes. In FIGS. 8 and 10, the same desirable dynamic characteristic is already given to all axes.

Figure 11:
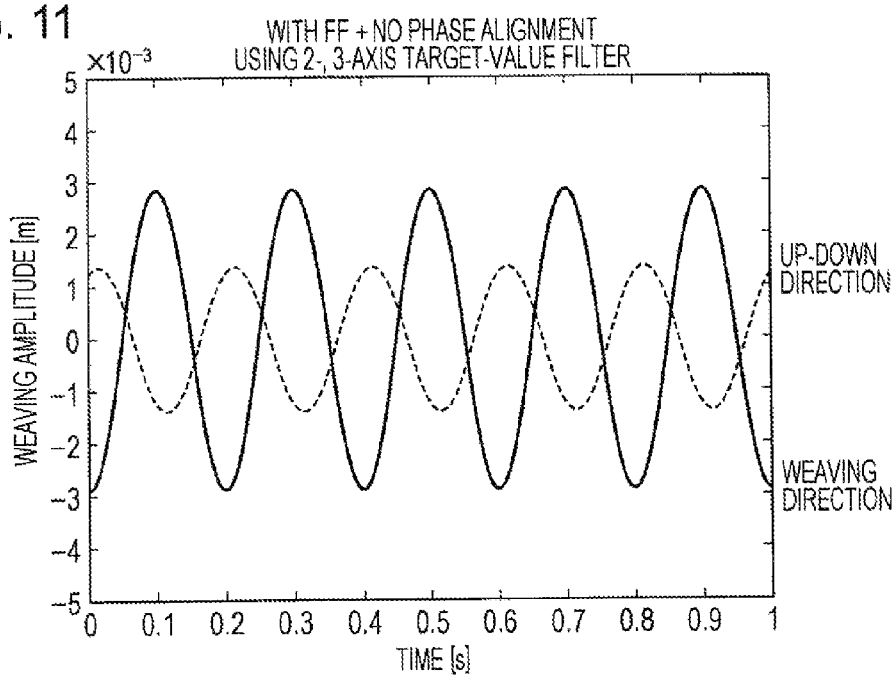
FIG. 11 is an illustration showing a weaving trajectory of an articulated robot controlled by an elastic-deformation-compensation control device (dynamic characteristic being changed for each axis) according to a fourth embodiment of the invention.

FIG. 11 shows a weaving trajectory when the desirable dynamic characteristic of each axis is slightly changed. As shown in FIG. 11, if the response to each axis is changed by changing the dynamic characteristic for each axis, it is found that an up-down motion is generated. That is, the results of the above-described first to third embodiments (and related art) are results when the responses of the respective axes are aligned. If the responses of the respective axes are not aligned, weaving accuracy is degraded.

Also, in the first to third embodiments, the desirable dynamic characteristics of all axes are the same. As it is found from Expression (1) and Expression (2), since the "dynamic characteristic 1" is multiplied by the reverse characteristic of the servo FB control dynamic characteristic, the response of the "dynamic characteristic 1" of an axis with a late servo FB control dynamic characteristic is earlier than the response of the "dynamic characteristic 1" of an axis with an early servo FB control dynamic characteristic. Also, the response of the "dynamic characteristic 1" of an axis with an early servo FB control dynamic characteristic is later than the response of the "dynamic characteristic 1" of an axis with a late servo FB control dynamic characteristic.

Referring to Expression (1) and Expression (2), giving the "dynamic characteristic 1" is the best method. However, the phase characteristic and gain characteristic from the joint-angle command value θlc to the joint angle θ are different depending on each axis. With the elastic-deformation-compensation control device according to this embodiment, by setting the "dynamic characteristic 1" of an axis with an early servo FB control dynamic characteristic to be later than that of an axis with an late servo FB control dynamic characteristic, the state in FIG. 11 can become gradually close to the state in any of FIGS. 3, 8, and 9 in which the same dynamic characteristic is given as the "dynamic characteristic 1" to all axes.

Fifth Embodiment

An elastic-deformation-compensation control device according to a fifth embodiment of the invention is described below. The elastic-deformation-compensation control device according to this embodiment differs from the elastic-deformation-compensation control device 10 according to the above-described first embodiment in that speed feedforward control and/or acceleration feedforward control, which are not provided in the elastic-deformation-compensation control device 10, are added. Other configuration is similar to that of the first embodiment, and hence the part redundant to the above-described configuration is not repeated this time.

In the above-described embodiment, the speed feedforward control and/or the acceleration feedforward control are not provided. However, an elastic-deformation-compensation control device 30 according to this embodiment has the speed feedforward control and the acceleration feedforward control.

Figure 12:
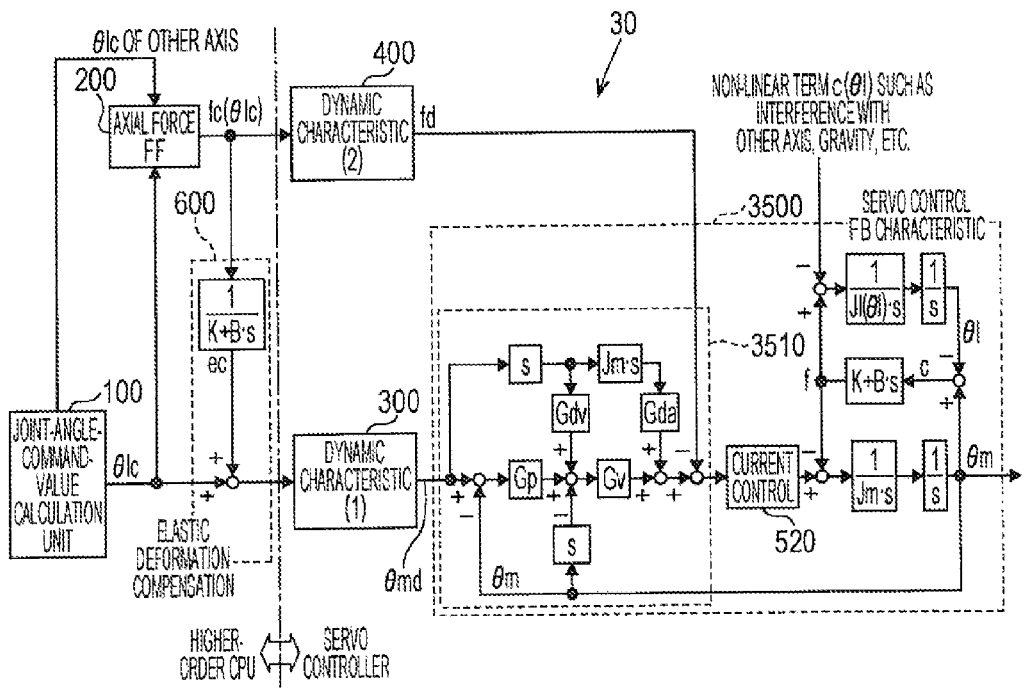
FIG. 12 is a control block diagram of an elastic-deformation-compensation control device according to a fifth embodiment of the invention.

FIG. 12 is a block diagram of the elastic-deformation-compensation control device 30 according to the fifth embodiment. The elastic-deformation-compensation control device 30 has the speed feedforward control and the acceleration feedforward control.

As shown in FIG. 12, the elastic-deformation-compensation control device 30 includes a motor-angle control unit 3510 instead of the motor-angle control unit 510.

In the elastic-deformation-compensation control device 30 shown in FIG. 12, Expression (1) is given by Expression (7) as follows.

$$\frac{(Gda \cdot Jd \cdot s^3 + Gdv \cdot Gv \cdot s^2 + (Gp \cdot Gv + Gdv \cdot Gi) \cdot s + Gp \cdot Gi)}{J_m \cdot s^3 + \text{current control characteristic} \times} \quad (7)$$
$$\text{current control characteristic} \times$$
$$(Gv \cdot s^2 + (Gp \cdot Gv + Gi) \cdot s + Gp \cdot Gi)$$

Based on Expression (7), the "dynamic characteristic 1" may be calculated by using Expression (2), Expression (4), and Expression (6). Even if the current control characteristic is ignored and "gain=1" is set, better performance than that of related art can be obtained.

In this case, Gda and Gdv respectively denote an acceleration feedforward gain and a speed feedforward gain, and each take a value from 0 to 1. Also, Jd denotes a prediction value of Jm.

Also, as described above, the current control characteristic can be also calculated from the current control gain and motor parameters (inductance and resistance).

As described above, with the elastic-deformation-compensation control device according to this embodiment, the speed feedforward control and the acceleration feedforward control are added, the influence of elastic deformation of each axis is compensated, and a motion such as weaving is enabled with high trajectory accuracy.

Modification of Fifth Embodiment

Next, an elastic-deformation-compensation control device according to a modification of the fifth embodiment of the invention is described below.

Figure 13:
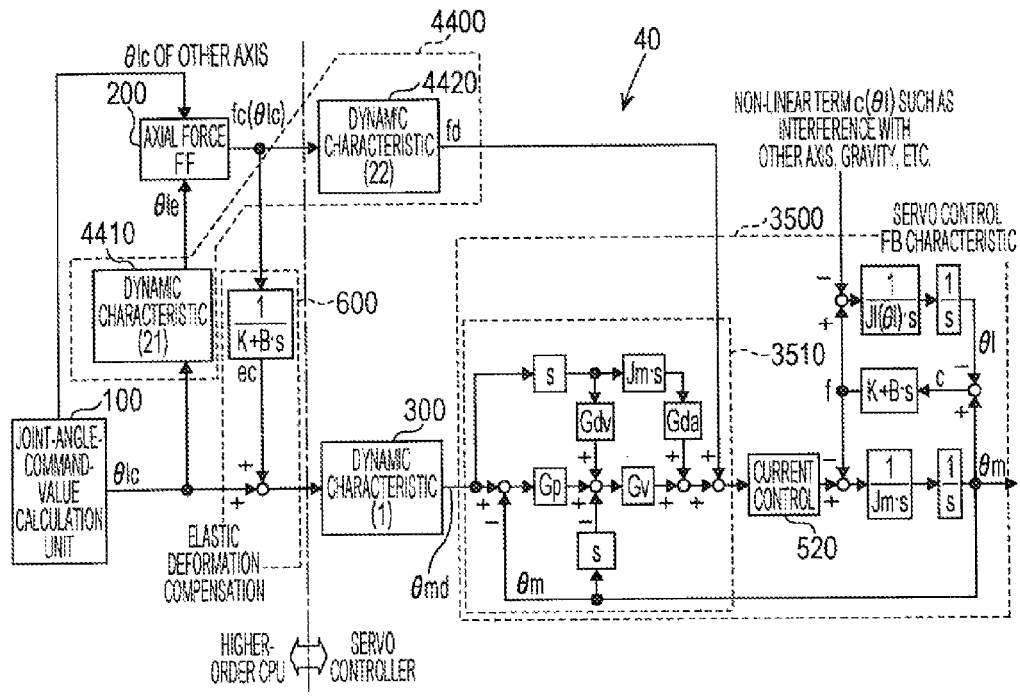
FIG. 13 is a control block diagram of an elastic-deformation-compensation control device according to a modification of the fifth embodiment of the invention.

As shown in FIG. 13, in this modification, a second dynamic characteristic calculation unit 4400 is arranged upstream and downstream of the axial force torque calculation unit 200 being the nonlinear term. To be more specific, a dynamic characteristic (21) 4410 is arranged upstream of the axial force torque calculation unit 200, and a dynamic characteristic (22) 4420 is arranged downstream of the axial force torque calculation unit 200.

In this case, if dynamic characteristic (21)×dynamic characteristic (22) is given to meet the above-described dynamic characteristic (2), effects equivalent to those of the above-described embodiments can be obtained. In this case, θle is an output value when the joint-angle command value θlc is input to the dynamic characteristic (21) 4410. An output value obtained when the axial force torque fc calculated by the axial force torque calculation unit 200 based on the value θle is input to the dynamic characteristic (22) 4420 is an axial force torque compensation value fd.

As described above, with the elastic-deformation-compensation control device according to this modification, in the articulated robot, the influence of elastic deformation of each axis is compensated by the second dynamic characteristic calculation unit arranged in a divided form, and a motion such as weaving is enabled with high trajectory accuracy.

Sixth Embodiment

An elastic-deformation-compensation control device according to a sixth embodiment of the invention is described below.

Figure 14:
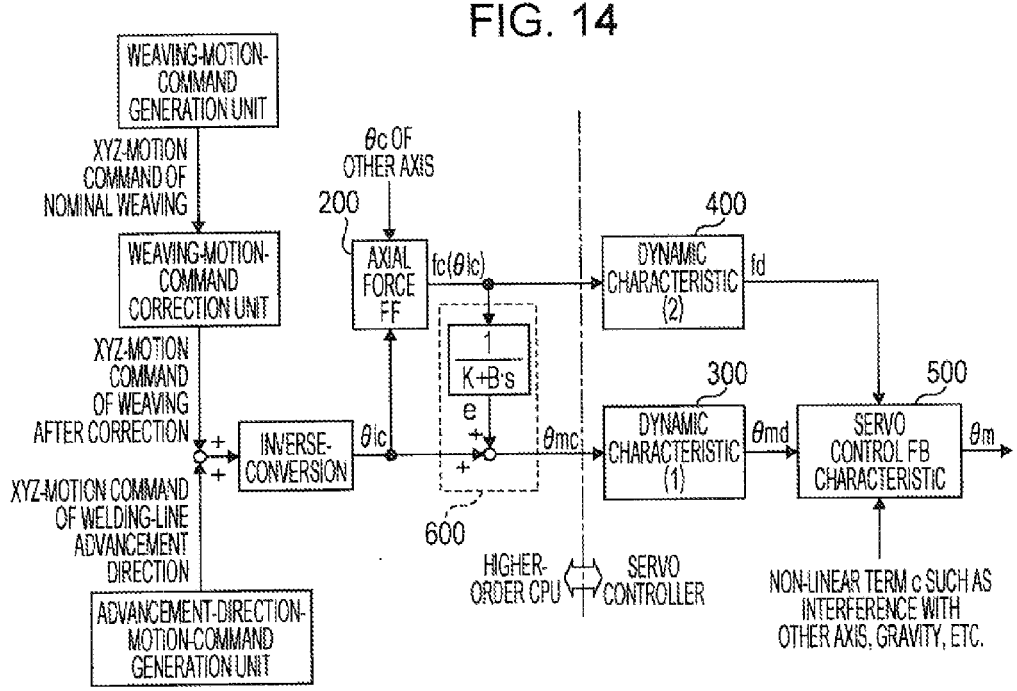
FIG. 14 is a control block diagram of an elastic-deformation-compensation control device according to a sixth embodiment of the invention.
Figure 15:
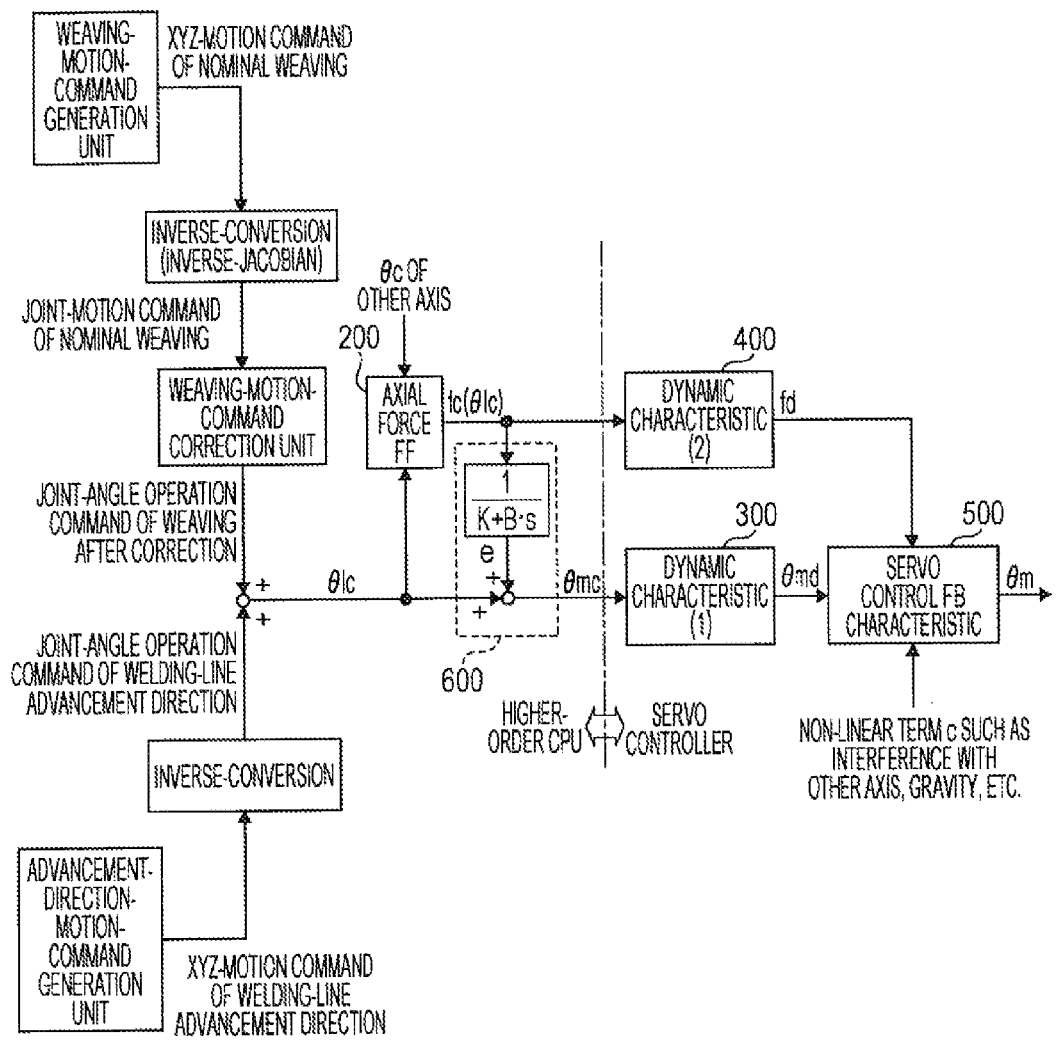
FIG. 15 is another control block diagram of the elastic-deformation-compensation control device according to the sixth embodiment of the invention.

FIGS. 14 and 15 are each a block diagram of an elastic-deformation-compensation control device according to this embodiment. The control block shown in FIG. 14 differs from the control block shown in FIG. 15 in the number and positions of inverse-conversion (inverse-Jacobian) elements.

In this embodiment, the dynamic characteristic is determined from a target value to an actual value by the "dynamic characteristic 2" (or "desirable dynamic characteristic"). Hence, based on the given "dynamic characteristic 2," the gain characteristic and phase characteristic in the period of the weaving operation can be inversely calculated. By correcting a weaving command in accordance with the characteristic, a desirable weaving operation can be provided.

Seventh Embodiment

An elastic-deformation-compensation control device according to a seventh embodiment of the invention is described below. The elastic-deformation-compensation control device according to this embodiment differs from the elastic-deformation-compensation control device 10 according to the above-described first embodiment in that a phase difference between an axial force torque calculation value or an elastic-deformation amount calculation value and a joint-angle command value is corrected. Other configuration is similar to that of the first embodiment, and hence the part redundant to the above-described configuration is not repeated this time.

In the elastic-deformation-compensation control device according to this embodiment, if the calculation period in the motor-angle-command-value calculation unit is later than the control period in the motor-angle control unit, the following processing is executed. In a motor-angle-command-value calculation unit 600, the phase difference between the axial force torque calculation value or the elastic-deformation amount calculation value and the joint-angle command value is corrected, and the motor-angle command value is calculated from the axial force torque calculation value or elastic-deformation amount calculation value after the phase correction and the joint-angle command value after the phase correction.

The elastic-deformation-compensation control device according to this embodiment is described in detail below. When the axial force is calculated, the speed and acceleration of the joint angle are required. In general, the speed and acceleration calculated by differential processing are used. In the axial force torque calculation unit 200 that calculates the axial force executes processing in a period dT, which is markedly later than the servo control period. Hence, the influence of phase delay due to the difference is significantly large, and phase correction is executed to align the phases.

For example, when the acceleration is derived from Expression (8), the speed is derived from Expression (9), and hence the phases can be aligned.

$$\ddot{\theta}_c(k) = (\theta_{lc}(k) - 2\theta_{lc}(k-1) + \theta_{lc}(k-2))/dT^2 \quad (8)$$

Not $\dot{\theta}_c(k) = (\theta_{lc}(k) - \theta_{lc}(k-1))/dT$, but $\dot{\theta}_c(k) = (\theta_{lc}(k-2))/2dT$ (9)

Also, the positions may be given by Expression (10) or Expression (11) as follows.

$$\theta_c(k) = (\theta_{lc}(k) + 2\theta_{lc}(k-1) + \theta_{lc}(k-2))/4 \quad (10)$$

$$\theta_c(k) = \theta_{lc}(k-1) \quad (11)$$

As described above, an elastic deformation amount ec is calculated by using the joint-angle command value θlc with the aligned phase, and when a motor command value is further calculated, the joint-angle command value θlc with the aligned phase is corrected by the elastic deformation amount ec. Thus, the motor-angle command value θmc may be calculated.

Advantageous Effects of Respective Embodiments

Like the first to seventh embodiments, the elastic-deformation-compensation control device configured as described below enables a motion such as weaving with high trajectory accuracy in an articulated robot, in which a motor and an arm are coupled through an elastically deformable reduction gear.

(1) A low-pass filter characteristic that cuts off a natural oscillation period from a target value is given, an oscillation component is eliminated from a target angle, and low-pass filer processing is executed even on an axial force torque. Accordingly, phases of the target value and the axial force torque are aligned, and hence elastic deformation compensation is executed while restricting oscillation.

(2) Even if a phase delay is preset in the servo controller, by delaying the low-pass filter characteristic relating to axial force torque compensation, the phases of the target value and the axial force compensation torque are aligned, and hence elastic deformation compensation is executed while restricting oscillation.

(3) By absorbing a difference in servo control characteristic depending on each axis with the above-described low-pass filter, a difference in characteristic depending on each axis is corrected.

(4) If the calculation period in the motor-angle-command-value calculation unit is later than the control period in the motor-angle control unit, the motor-angle-command-value calculation unit corrects the phase difference between the axial force torque calculation value or the elastic-deformation amount calculation value and the joint-angle command value.

(5) After the above-described processing, a weaving amplitude is corrected on a weaving period basis.

The embodiments disclosed this time are merely examples, and it should be considered that the configurations are not limited to those of the embodiments. The scope of the invention is determined by the claims but not by the above description, and all modifications with meanings equivalent to the claims and within the range of the claims are intended to be included. This application is based on Japanese Patent Application (No. 2012-123239) filed May 30, 2012, which is hereby incorporated by reference herein in its entirety.

REFERENCE SIGNS LIST

1 articulated robot
10, 20, 30, 40 elastic-deformation-compensation control device
100 joint-angle-command-value calculation unit
200 axial force torque calculation unit (axial force FF)
300 first dynamic characteristic calculation unit (dynamic characteristic (1))
400, 2400, 4400 second dynamic characteristic calculation unit (dynamic characteristic (2))
500 feedback control unit (servo control FB characteristic)
600 motor-angle-command-value calculation unit (elastic deformation compensation)
510 motor-angle control unit
520 motor-current control unit (current control)

The invention claimed is:

1. An elastic-deformation-compensation control device for an articulated robot including a motor and an arm being coupled through an elastically deformable reduction gear in the articulated robot, a tool being attached to the articulated robot, and a plurality of joint axes each being driven by the motor to cause the tool to perform a desirable operation, the elastic-deformation-compensation control device comprising:
   a joint-angle-command-value calculation unit that calculates a joint-angle command value θlc of each of the joint axes for providing the desirable operation of the tool, and outputs the joint-angle command value θlc;
   an axial force torque calculation unit that calculates an axial force torque fc generated when an operation is made according to the joint-angle command value θlc and acting on each of the joint axes, from the joint-angle command value θlc based on a model of dynamics, and outputs the axial force torque fc;
   a motor-angle-command-value calculation unit that calculates a motor-angle command value θmc from the joint-angle command value θlc and the axial force torque fc based on a parameter including a stiffness parameter of the joint axis, and outputs the motor-angle command value θmc;
   a first dynamic characteristic calculation unit that has a high-frequency cutoff characteristic having a cutoff frequency being lower than a natural resonance frequency of the articulated robot, executes filtering processing on the motor-angle command value θmc, and outputs a processed motor-angle target value θmd;
   a motor-angle control unit that receives the motor-angle target value θmd input as a target value for the motor;
   a second dynamic characteristic calculation unit that has a high-frequency cutoff characteristic having a cutoff frequency being lower than or equal to the first dynamic characteristic calculation unit, executes filtering processing on at least one of an input to the axial force torque calculation unit and an output from the axial force torque calculation unit, and outputs a processed axial force torque compensation value fd; and
   a motor-current control unit that receives a value input as a target value, in which the axial force torque compensation value fd is added to a motor-torque command value output from the motor-angle control unit.

2. The elastic-deformation-compensation control device for the articulated robot according to claim 1, wherein a phase delay of the first dynamic characteristic calculation unit of an axis with a late response of the motor-angle control unit is set to be shorter than a phase delay of the first dynamic characteristic calculation unit of an axis with an early response of the motor-angle control unit.

3. The elastic-deformation-compensation control device for the articulated robot according to claim 1,
   wherein a feedback control dynamic characteristic from the motor-angle target value θmd to an actual motor angle θm in a state without an axial force among the respective axes is calculated based on a parameter including at least one of a position feedback gain and a speed feedback gain, and
   wherein the cutoff frequency in the second dynamic characteristic calculation unit is set to be lower than the cutoff frequency in the first dynamic characteristic calculation unit, and the characteristic of the first dynamic characteristic calculation unit is given to correspond to a characteristic obtained by dividing the characteristic in the second dynamic characteristic calculation unit by the feedback control dynamic characteristic.

4. The elastic-deformation-compensation control device for the articulated robot according to claim 2,
wherein a feedback control dynamic characteristic from the motor-angle target value θmd to an actual motor angle θm in a state without an axial force among the respective axes is calculated based on a parameter including at least one of a position feedback gain and a speed feedback gain, and
wherein the cutoff frequency in the second dynamic characteristic calculation unit is set to be lower than the cutoff frequency in the first dynamic characteristic calculation unit, and the characteristic of the first dynamic characteristic calculation unit is given to correspond to a characteristic obtained by dividing the characteristic in the second dynamic characteristic calculation unit by the feedback control dynamic characteristic.

5. The elastic-deformation-compensation control device for the articulated robot according to claim 3, wherein, when a current control characteristic of the motor-current control unit is considered, the characteristic of the first dynamic characteristic calculation unit is given to correspond to a characteristic obtained by dividing the characteristic in the second dynamic characteristic calculation unit by the feedback control dynamic characteristic and multiplying the divided value by the current control characteristic.

6. The elastic-deformation-compensation control device for the articulated robot according to claim 4, wherein, when a current control characteristic of the motor-current control unit is considered, the characteristic of the first dynamic characteristic calculation unit is given to correspond to a characteristic obtained by dividing the characteristic in the second dynamic characteristic calculation unit by the feedback control dynamic characteristic and multiplying the divided value by the current control characteristic.

7. The elastic-deformation-compensation control device for the articulated robot according to claim 1,
wherein, if a calculation period in the motor-angle-command-value calculation unit is later than a control period in the motor-angle control unit,
in the motor-angle-command-value calculation unit, a phase difference between an axial force torque calculation value or an elastic-deformation amount calculation value and a joint-angle command value is corrected, and a motor-angle command value is calculated from the axial force torque calculation value or elastic-deformation amount calculation value after the phase correction and the joint-angle command value after the phase correction.

8. An elastic-deformation-compensation control method for an articulated robot including a motor and an arm being coupled through an elastically deformable reduction gear in the articulated robot, a tool being attached to the articulated robot, and a plurality of joint axes each being driven by the motor to cause the tool to perform a desirable operation, the elastic-deformation-compensation control method comprising:
a joint-angle-command-value calculation step of calculating a joint-angle command value θlc of each of the joint axes for providing the desirable operation of the tool, and outputting the joint-angle command value θlc;
an axial force torque calculation step of calculating an axial force torque fc generated when an operation is made according to the joint-angle command value θlc and acting on each of the joint axes, from the joint-angle command value θlc based on a model of dynamics, and outputting the axial force torque fc;
a motor-angle-command-value calculation step of calculating a motor-angle command value θmc from the joint-angle command value θlc and the axial force torque fc based on a parameter including a stiffness parameter of the joint axis, and outputting the motor-angle command value θmc;
a first dynamic characteristic calculation step of having a high-frequency cutoff characteristic having a cutoff frequency being lower than a natural resonance frequency of the articulated robot, executing filtering processing on the motor-angle command value θmc, and outputting a processed motor-angle target value θmd;
a motor-angle control step of receiving the motor-angle target value θmd input as a target value for the motor;
a second dynamic characteristic calculation step of having a high-frequency cutoff characteristic having a cutoff frequency being lower than or equal to the first dynamic characteristic calculation step, executing filtering processing on at least one of an input to the axial force torque calculation step and an output from the axial force torque calculation step, and outputting a processed axial force torque compensation value fd; and
a motor-current control step of receiving a value input as a target value, in which the axial force torque compensation value fd is added to a motor-torque command value output from the motor-angle control step.

* * * * *